United States Patent
Park et al.

(10) Patent No.: US 7,092,747 B2
(45) Date of Patent: Aug. 15, 2006

(54) SLIDING/SWING-TYPE PORTABLE DIGITAL COMMUNICATION APPARATUS

(75) Inventors: Bum-Soo Park, Gwangmyeong-si (KR); Jong-Seong Lee, Seoul (KR); Sang-Min Hyun, Seoul (KR)

(73) Assignee: Samsung Electronics Co., Ltd., (KR)

( * ) Notice: Subject to any disclaimer, the term of this patent is extended or adjusted under 35 U.S.C. 154(b) by 148 days.

(21) Appl. No.: 10/933,718

(22) Filed: Sep. 3, 2004

(65) Prior Publication Data

US 2005/0090298 A1    Apr. 28, 2005

(30) Foreign Application Priority Data

Oct. 23, 2003    (KR) .................. 10-2003-0074310

(51) Int. Cl.
*H04M 1/10* (2006.01)
(52) U.S. Cl. .................. 455/575.4; 455/556.1; 455/550.1; 455/575.1
(58) Field of Classification Search .......... 455/575.1, 455/575.3, 575.4, 550.1, 556.1, 556.2, 90.3
See application file for complete search history.

(56) References Cited

U.S. PATENT DOCUMENTS

2005/0130720 A1* 6/2005 Finke-Anlauff .......... 455/575.3
2005/0137000 A1* 6/2005 Toh et al. ................. 455/575.4

* cited by examiner

*Primary Examiner*—Nick Corsaro
*Assistant Examiner*—Sayed T. Zewari
(74) *Attorney, Agent, or Firm*—Dilworth & Barrese, LLP

(57) ABSTRACT

A sliding/swing-type portable digital communication apparatus is disclosed. A first housing extends in a longitudinal direction and includes a camera lens housing mounted on its bottom surface and at least one speaker unit positioned adjacent to the camera lens housing. A second housing is adapted to slide/swing while continuously facing a top surface of the first housing and is disposed parallel to the first housing along the longitudinal direction. A cover is coupled to a portion of the bottom surface of the first housing and is adapted to slide along the longitudinal direction. An opening is formed on the cover to selectively expose or hide the camera lens housing or the first speaker units according to whether or not the cover has been slid.

15 Claims, 8 Drawing Sheets

SLIDING/SWING-TYPE PORTABLE DIGITAL COMMUNICATION APPARATUS

PRIORITY

This application claims priority to an application entitled "A Sliding/Swing-Type Portable Digital Communication Apparatus" filed with the Korean Intellectual Property Office on Oct. 23, 2003 and assigned Serial No. 2003-74310, the contents of which are hereby incorporated by reference.

BACKGROUND OF THE INVENTION

1. Field of the Invention

The present invention relates to portable communication apparatuses, such as cellular phones, PDAs (personal digital assistants), HHPs (hand held phones), and PCS (personal communication service) phones, and more particularly to portable digital communication apparatuses having a first housing which is capable of making sliding and swing movements with respect to a second housing to expose a working portion of the apparatus.

2. Description of the Related Art

In general, a "portable communication apparatus" refers to an electronic apparatus which a user can carry with him/her to perform wireless communication with a desired partner. In consideration of portability, designs of such portable communication apparatuses have been developed to emphasize not only compactness, slimness, and lightness, but also multimedia availability, thus having a wider variety of functions. In particular, future portable communication apparatuses are expected to incorporate greater multi-functionality and multi-purpose utilization, and greater compactness and lightness, but also will be modified to be suitable for various multimedia environments or Internet environments. Additionally, such portable communication apparatuses are now commonly used by all kinds of people, including both men and women, young and old, throughout the world, and are recognized by some people as a nearly indispensable commodity which must always be carried.

Conventional portable communication apparatuses may be classified into various types according to their appearance, such as bar-type portable communication apparatuses, flip-type portable communication apparatuses, and folder-type portable communication apparatuses. The bar-type portable communication apparatus has a single housing shaped like a bar. The flip-type portable communication apparatus has a flip which is pivotably mounted to a bar-shaped housing by a hinge unit. The folder-type portable communication apparatus has a folder coupled to a single bar-shaped housing by a hinge unit in such a manner that the folder can be rotated in order to be folded to or unfolded from the housing.

Further, portable communication apparatuses may be classified into neck wearable type communication apparatuses and wrist wearable type communication apparatuses according to the position at or the way in which a user puts on the communication apparatus. The neck wearable type communication apparatus is one which a user wears around the neck using a string, while the wrist wearable type communication apparatus is one which a user wears around the wrist.

Additionally, portable communication apparatuses may be classified into rotation-type communication apparatuses and sliding-type communication apparatuses according to ways of opening and closing the communication apparatuses. In the rotation-type portable communication apparatus, two housings are coupled to each other in such a manner that one housing rotates to be opened or closed relative to the other while the housings face each other. In the sliding-type portable communication apparatus, two housings are coupled to each other in a manner that one housing slides to be opened or closed relative to the other. These variously classified portable communication apparatuses can be easily understood by those skilled in the art.

Conventional portable communication apparatuses are now capable of transmitting data at a high speed in addition to the basic function of performing voice communication. In other words, according to increasing demand by consumers, portable communication apparatuses now provide a service using a wireless communication technology capable of transmitting data at a high speed.

Recently developed portable communication apparatuses are now equipped with a camera lens which enables each of the communication apparatuses to transmit an image signal. That is, current conventional portable communication apparatuses may have an imbedded or external camera lens or a photographing means which enables a user to transmit an image to a desired partner or to take a photograph of a desired subject.

However, conventional portable communication apparatuses, in particular sliding-type portable communication apparatuses such as that disclosed in Korean Patent Application No. 2002-71911 (the contents of which are hereby incorporated by reference) filed in the name of the present applicant, are constructed in such a way that when they are used in an e-mail transmission mode, in a chatting mode, or in a PDA mode, their key operations are inconvenient. This is because they have relatively small number of keys and thus make it difficult to perform complex data input operations.

In addition, the sliding-type portable communication apparatuses as mentioned above often require that their numeric keys and character keys be used in combination. In addition, their screens or display devices mounted thereon are narrow and thus sometimes are difficult to view. Their display devices, which are mounted on their sliding housings, have a vertical size relatively larger than their horizontal size, thus limiting their effective normal usage.

SUMMARY OF THE INVENTION

Accordingly, an object of the present invention is to provide a sliding/swing-type portable digital communication apparatus which can be conveniently used in taking a picture of a subject.

Another object the present invention is to provide a sliding/swing-type portable digital communication apparatus having means for protecting its camera lens.

Still another object of the present invention is to provide a sliding/swing-type portable digital communication apparatus adapted to facilitate quickness, correctness, and convenience in key operations, in particular in key pressing, using both hands.

Still another object of the present invention is to provide a sliding/swing-type portable digital communication apparatus wherein the utility of its display device is maximized; in particular its display device has a horizontal size larger than the vertical size for displaying an extended screen.

In order to accomplish the above objects, there is provided a sliding/swing-type portable digital communication apparatus including a first housing extending in a longitudinal direction and including a camera lens housing mounted on its bottom surface and at least one first speaker unit positioned adjacent to the camera lens housing; a second housing adapted to slide/swing while continuously facing a top surface of the first housing and being disposed parallel to the first housing along the longitudinal direction; a cover coupled to a side of the bottom surface of the first housing and adapted to slide along the longitudinal direction; and at least one first opening formed on the cover to selectively expose or hide the camera lens housing or the first speaker unit.

In accordance with another aspect of the present invention, there is provided a sliding/swing-type portable digital communication apparatus including a first housing extending in a longitudinal direction and having camera lens openings formed on predetermined areas of each of its top and bottom surfaces; a rotatable camera lens housing positioned in the camera lens openings and having a camera lens adapted to be exposed visibly toward the top or bottom surfaces; a pair of stereo speaker units mounted on the bottom surface of the first housing and disposed adjacent to the camera lens housing; a cover coupled to a side of the bottom surface of the first housing and adapted to slide along the longitudinal direction; a first opening formed on the cover to selectively expose or hide the camera lens housing or a first stereo speaker unit according to a position of the cover; and a second opening formed adjacent to the first opening to expose/hide the first stereo speaker unit only.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
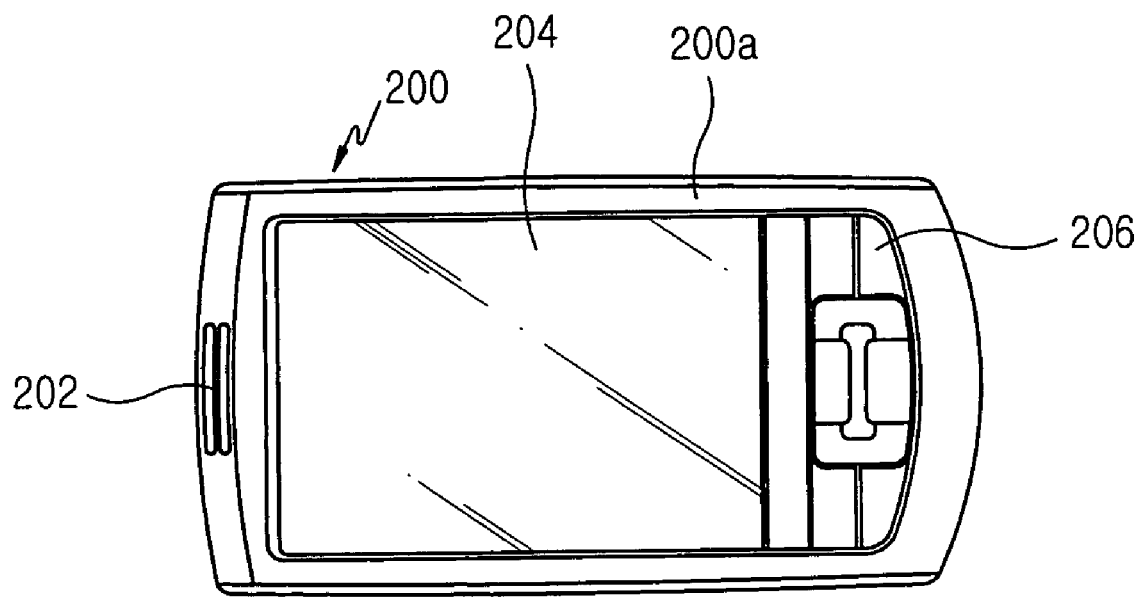
FIG. 1 is a front plan view showing a sliding/swing-type portable digital communication apparatus according to the present invention.

Hereinafter, preferred embodiments of the present invention will be described with reference to the accompanying drawings. In the following description of the present invention, a detailed description of known functions and configurations incorporated herein will be omitted when it may make the subject matter of the present invention unclear.

As shown in FIGS. 1 to 6, a sliding/swing-type portable digital communication apparatus according to a preferred embodiment of the present invention comprises: a first housing 100; a second housing 200 adapted to slide/swing while continuously facing top surfaces 110, 120 of the first housing 100; a cover 400 coupled to a portion of a bottom surface 100b of the first housing 100 to slide along a longitudinal direction of the first housing 100; and at least one first opening 350 formed on the cover 400 to expose/hide predetermined areas of the bottom surface 100b of the first housing 100. As will be described in detail below, the predetermined areas refer to the areas wherein a camera lens 310 and first speaker units SPK1, SPK2 of the first housing are positioned. After full sliding/swing movements, the second housing 200 is positioned parallel along the longitudinal direction of the first housing 100.

The first housing 100 includes top surfaces 110, 120 and a bottom surface 100b. The top surfaces are composed of a first top surface 110 and a second top surface 120 disposed adjacent to the first top surface 110.

The first top surface 110 is provided with a first key array 112 composed of a number of keys and the second top surface 120 is provided with a second key array 122 composed of a keyboard having a number of keys. The number of keys composing the first key array 112 is smaller than that of keys composing the keyboard of the second key array 122. Preferably, the keys composing the first key array 112 are associated with camera operations. Specifically, the first key array 112 is composed of a zoom-in key, a zoom-out key, a macro key, a photographing mode key, and the like. Meanwhile, the second key array 122 is composed of keys associated with operating an e-mail transmission mode or a PDA mode; specifically, numeric keys, character keys, a space key, an enter key, a shift key, direction keys, function keys, and the like. The keyboard of second key array 122 is composed of at least forty-five keys.

The first housing 100 is provided with, on its bottom surface 100b, a camera lens housing 310 and at least one first speaker unit SPK1, SPK2 disposed adjacent to the camera lens housing 310. The camera lens housing 310 has a hinge axis oriented perpendicular to the longitudinal direction of the first housing 100. The camera lens housing 310 is provided with, on its outer peripheral surface, a camera lens 302 and a lighting unit 304 disposed adjacent to the camera lens 302 about the hinge axis.

The first speaker units SPK1, SPK2 comprise a pair of speakers to provide stereo sound. They are spaced from each other along a direction perpendicular to the longitudinal direction of the first housing 100. Accordingly, the camera lens housing 310 is disposed adjacent to each of the first speaker units SPK1, SPK2 in a parallel manner.

Figure 3:
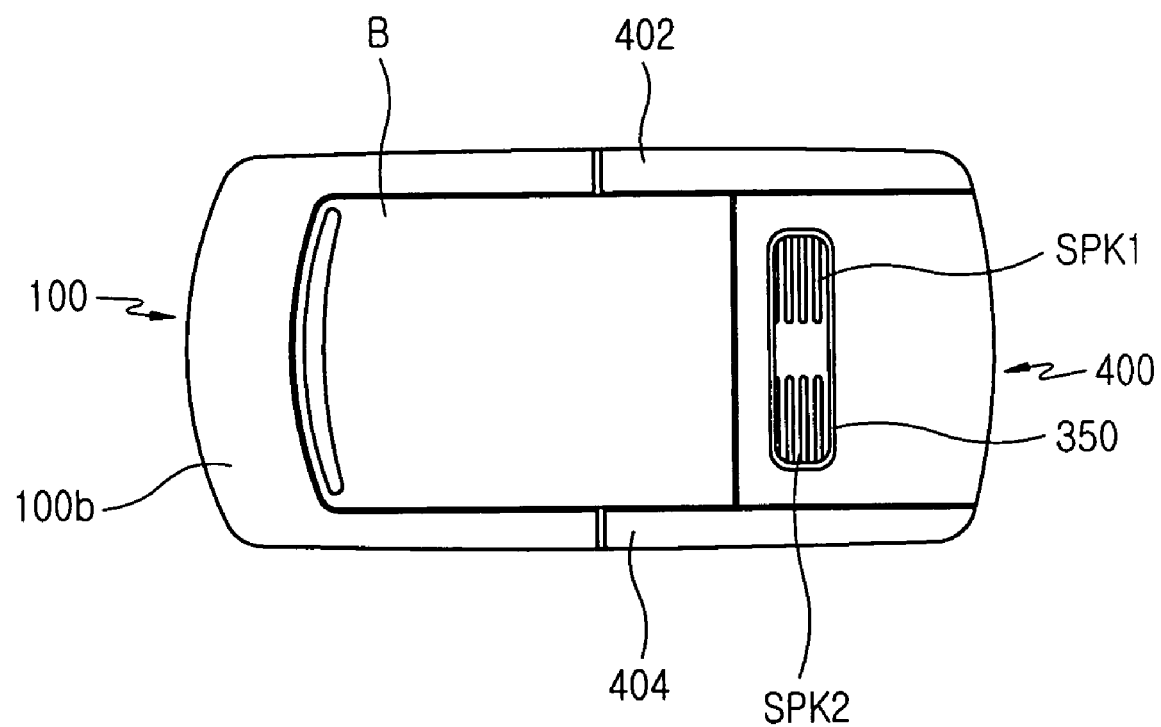
FIG. 3 is a rear plan view of the sliding/swing-type portable digital communication apparatus shown in FIG. 1.
Figure 4:
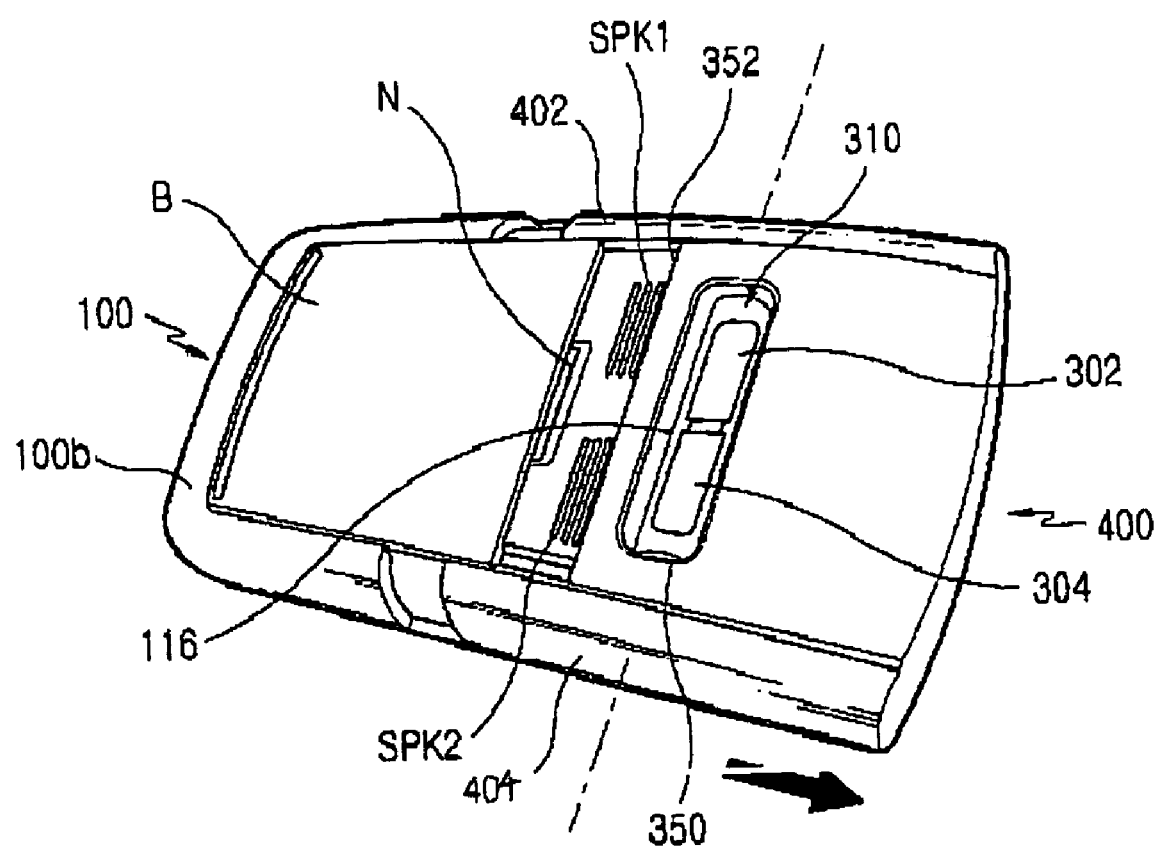
FIG. 4 is a rear perspective view of a sliding/swing-type portable digital communication apparatus according to a preferred embodiment of the present invention after a movement of its cover.
Figure 5:
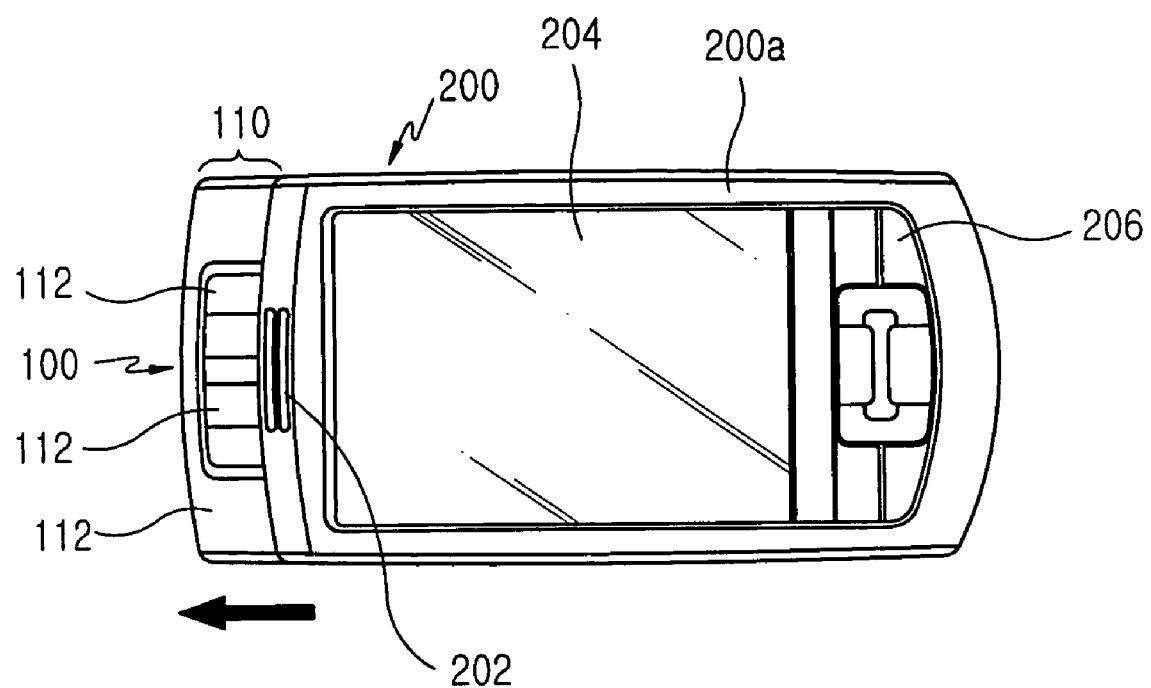
FIG. 5 is a front plan view of the sliding/swing-type portable digital communication apparatus shown in FIG. 4.
Figure 6:
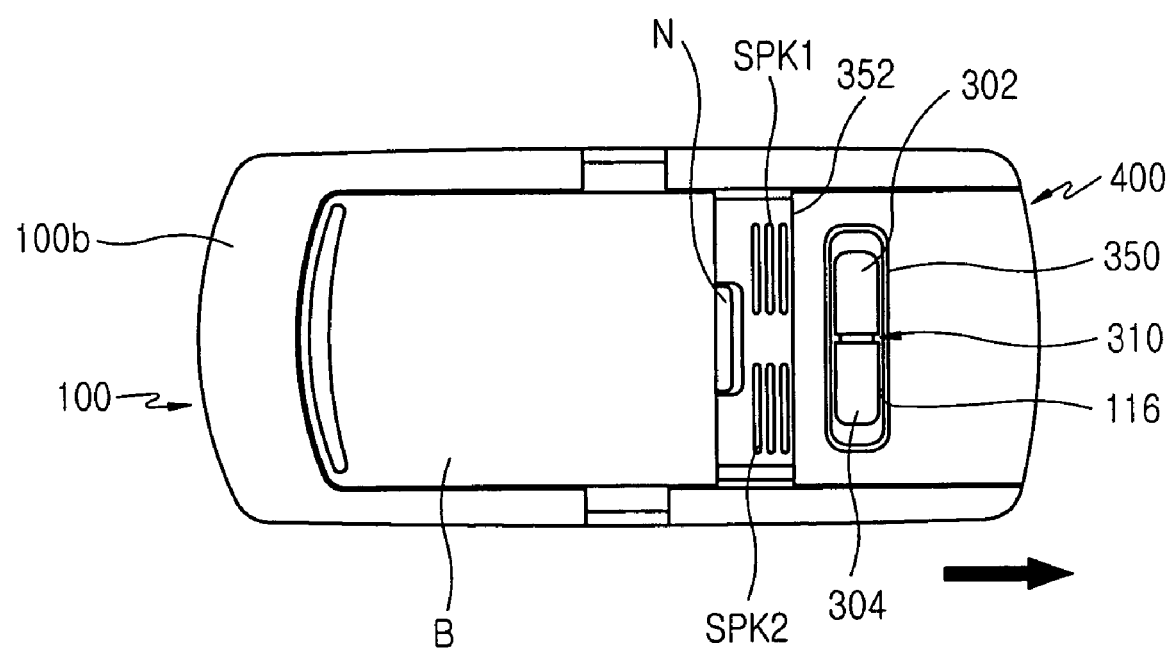
FIG. 6 is a rear plan view of the sliding/swing-type portable digital communication apparatus shown in FIG. 4.

As shown in FIGS. 3, 4 and 6, cover 400 includes first opening 350 adapted to selectively expose/hide the first speaker units SPK1, SPK2 or the camera lens housing 310 depending upon the position of the cover 400. In a first position as shown in FIG. 3, first opening 350 exposes only first speaker units SPK1 and SPK2. In a second position, as shown in FIG. 4, sliding left and right side walls 402, 404 of cover 400 results in first opening 350 exposing camera lens housing 310, while a second opening 352 exposes the first speaker units SPK1, SPK2. The first and second openings 350, 352 are disposed adjacently and parallel to each other along the hinge axis of the camera lens housing 310. The first and second openings 350, 352 also extend in a direction perpendicular to the longitudinal direction of the first housing 100.

Figure 2:
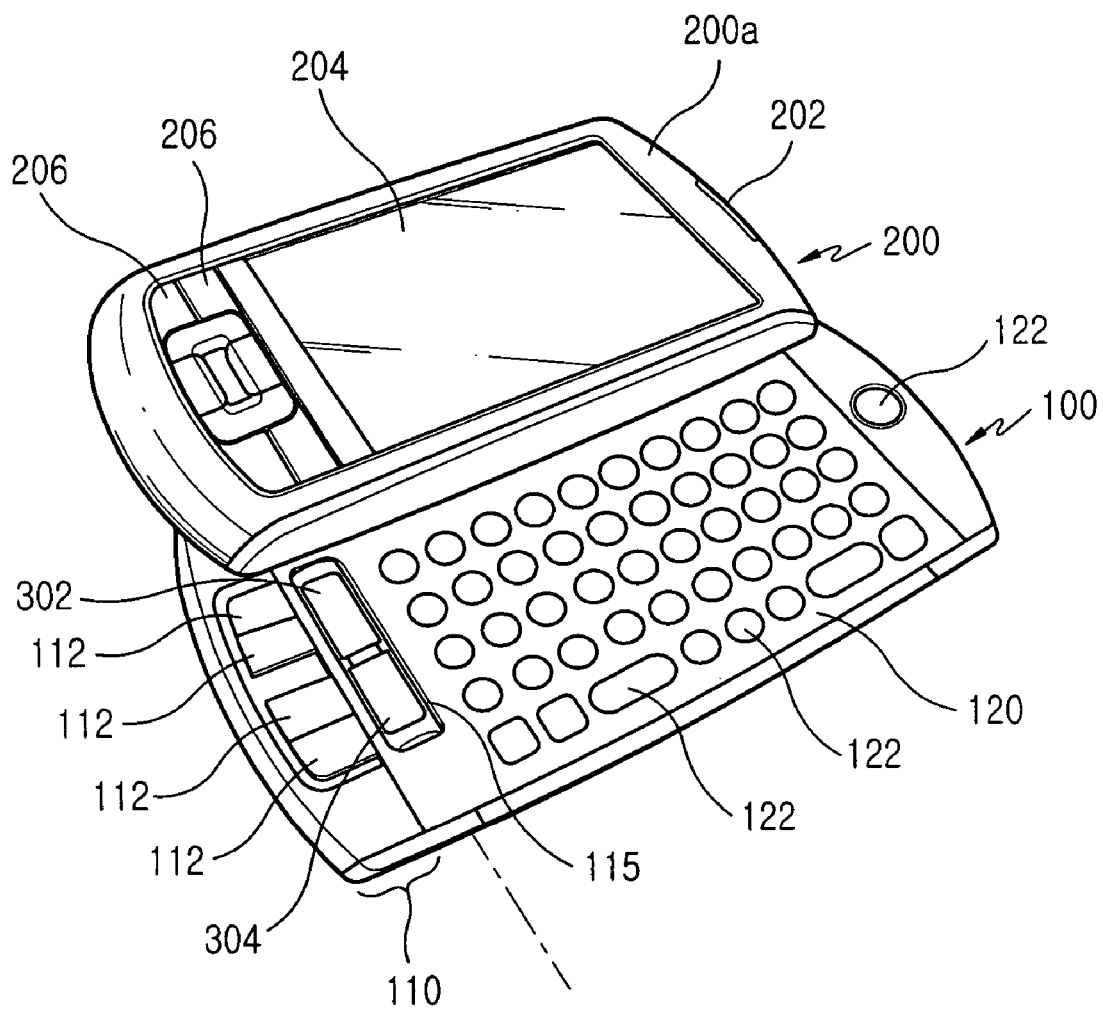
FIG. 2 is a perspective view showing a sliding/swing-type portable digital communication apparatus according to a preferred embodiment of the present invention after full sliding/swing movements.

The first housing 100 is also provided with openings 115, 116 for exposing predetermined areas of its top and bottom surfaces, respectively, and for positioning the camera lens housing 310 therein. According to whether the camera lens housing 310 is rotated or not, the camera lens 302 is exposed through the opening 115, formed on the top surface as shown in FIG. 2, or through the second opening 116, formed on the bottom surface as shown in FIG. 4. FIG. 4 illustrates the camera lens 302 exposed toward the bottom surface 100b of the first housing 100, while FIG. 2 illustrates the camera lens 302 exposed toward the second top surface 120 of the first housing 100.

When the cover 400 is not slid open but is kept closed, as shown in FIG. 3, the first opening 350 exposes the first speaker units SPK1, SPK2 only. When the cover 400 is slid open, the first and second openings 350, 352 expose both the first speaker units SPK1, SPK2 and the camera lens housing 310, as shown in FIG. 4.

The first housing is provided with, on its bottom surface 100b, a battery pack B and a locking knob N for mounting/removing the battery pack B, as shown in FIG. 4. The battery pack B is always visibly exposed, whereas the locking knob N is exposed or hidden according to whether the cover 400 is slid open or not. Specifically, the locking knob N is exposed/hidden by the second opening 352. Consequently, when the battery pack B needs to be removed from the first housing 100, the cover 400 is first slid open.

The second housing 200 includes a top surface 200a and a bottom surface 200b (not shown). The top surface 200a is provided with a second speaker unit 202, a display unit 204 disposed adjacent to the second speaker unit 202, and a third key array 206 composed of a number of keys disposed adjacent to the display unit 204. The third key array 206 consists of a speech key, a speech termination key, a backspace key, and the like. The display unit 204 may be composed of an LCD module, a touch screen, or a hologram screen. The bottom surface 200b is adapted to slide/swing while continuously facing the first and second top surfaces 110 and 120 of the first housing 100.

In a state as shown in FIG. 1, the display unit 204 and the third key array 206 are disposed adjacent to each other. In a state as shown in FIG. 2, the first key array 112, the camera lens 302, the lighting unit 304, and the second key array 122 are disposed adjacent one another.

Sliding/swing operations of the portable digital communication apparatus according to the present invention will now be described with reference to FIGS. 7a to 7d.

Figure 7A:
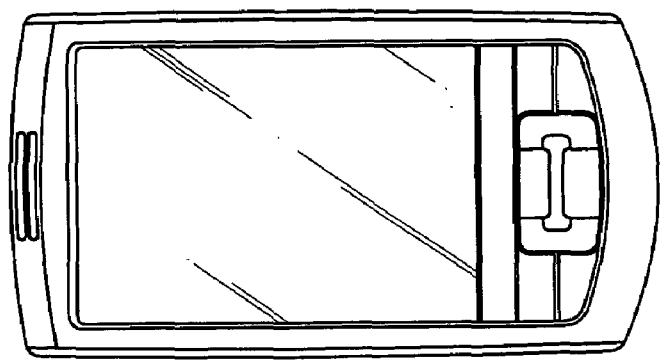
FIGS. 7a to 7d are front plan views showing consecutive sliding/swing procedures of a sliding/swing-type portable digital communication apparatus according to a preferred embodiment of the present invention.
Figure 7B:
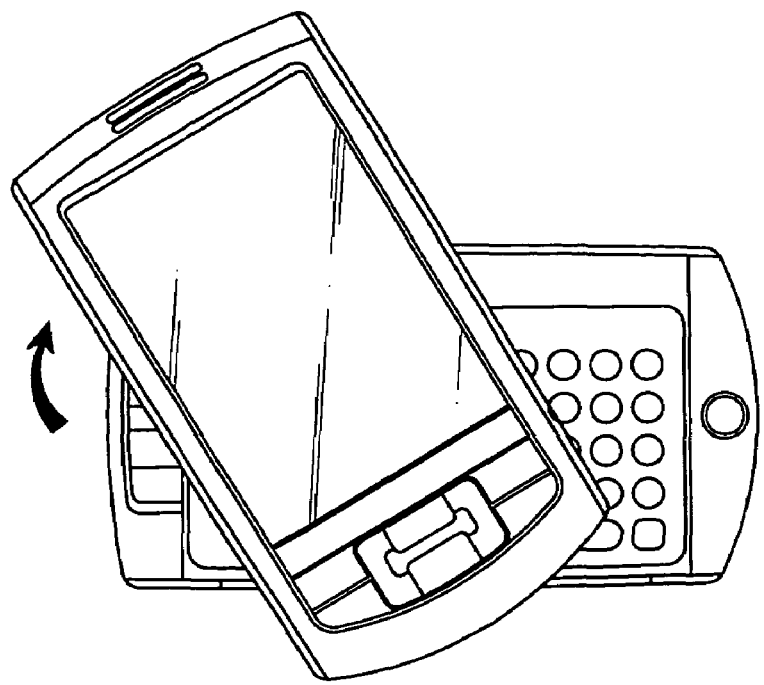
Figure 7C:
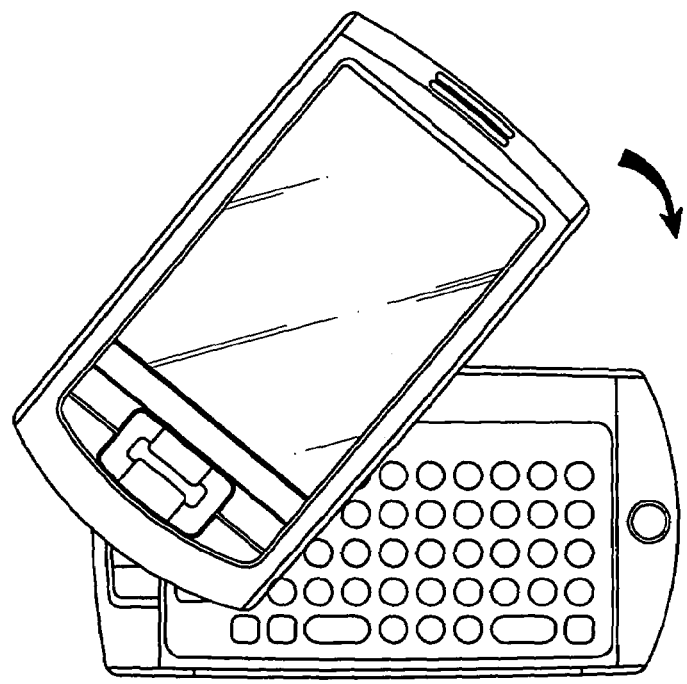
Figure 7D:
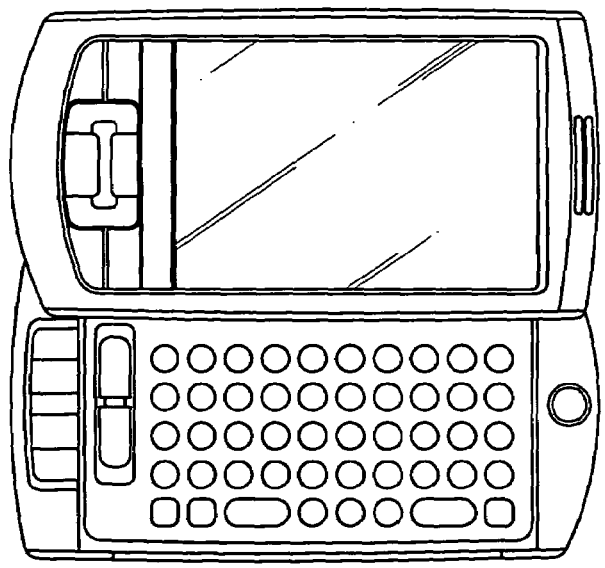

If the second housing is rotated clockwise about a hinge (not shown) from the state shown in FIG. 7a, it undergoes each of the states shown in FIGS. 7b, 7c, and finally 7d. In a state as shown in FIG. 7d, a user can conveniently operate keys using both hands freely in an e-mail transmission mode, in a game mode, in a customized video mode, or in a PDA mode. The user also can use an extended display device and a rotatable camera lens. In addition, it is convenient to operate keys associated with a camera.

The sliding/swing operations of the second housing 200 can be implemented manually, semi-automatically, or automatically using a power source.

As mentioned above, the present invention provides a sliding/swing-type portable digital communication apparatus having a number of key arrays positioned to facilitate convenience in key operations, in particular quickness, correctness, and convenience in key pressing. This enables a user to use the communication apparatus in a more convenient way. There is also an advantage in that an extended display device is provided and the camera lens is protected from outside when it is not used.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A sliding/swing-type portable digital communication apparatus comprising:
    a first housing extending in a longitudinal direction and including a camera lens housing mounted on its bottom surface and at least one first speaker unit positioned adjacent to the camera lens housing;
    a second housing adapted to slide/swing while continuously facing a top surface of the first housing and being disposed parallel to the first housing along the longitudinal direction;
    a cover coupled to a portion of the bottom surface of the first housing and adapted to slide along the longitudinal direction; and
    at least one opening formed on the cover to selectively expose or hide the camera lens housing or the first speaker unit according to a position of the cover.

2. A sliding/swing-type portable digital communication apparatus as claimed in claim 1, wherein the first housing is provided with, on a top surface, a first key array composed of a number of keys and a second key array composed of a number of keys disposed adjacent to the first key array; the number of keys of the first key array being smaller than the number of keys of the second key array; the first key array being composed of keys associated with the camera lens; and the second key array being composed of a keyboard including numeric keys, character keys and function keys.

3. A sliding/swing-type portable digital communication apparatus as claimed in claim 1, wherein the first housing is provided with, on a bottom surface, a battery pack and a locking knob adapted to be exposed or hidden according to a position of the cover.

4. A sliding/swing-type portable digital communication apparatus as claimed in claim 1, wherein the first speaker unit comprises a pair of speakers to provide stereo sound and are spaced from each other along a direction perpendicular to the longitudinal direction.

5. A sliding/swing-type portable digital communication apparatus as claimed in claim 1, wherein the camera lens housing has a hinge axis oriented perpendicular to the longitudinal direction of the first housing and is provided with a camera lens and a lighting unit disposed adjacent to the camera lens along the hinge axis.

6. A sliding/swing-type portable digital communication apparatus as claimed in claim 1, wherein the first housing is provided with openings disposed in each of its top and bottom surfaces and for positioning the camera lens housing therein and, according to direction in which the camera lens housing is rotated, the camera lens housing is exposed facing the top surface or the bottom surface.

7. A sliding/swing-type portable digital communication apparatus as claimed in claim 1, wherein the second housing is provided with, on a top surface, a second speaker unit, a display unit disposed adjacent to the second speaker unit, and a third key array composed of a number of keys disposed adjacent to the display unit.

8. A sliding/swing-type portable digital communication apparatus as claimed in claim 1, wherein the cover opening includes a first opening adapted to selectively expose the first speaker units or the camera lens housing depending on the position of the cover, and a second opening adapted to expose/hide the first speaker unit only depending on the position of the cover; the first and second openings being disposed adjacent to each other.

9. A sliding/swing-type portable digital communication apparatus as claimed in claim 1, wherein the cover opening extends in a direction perpendicular to the longitudinal direction.

10. A sliding/swing-type portable digital communication apparatus as claimed in claim 1, wherein, when the cover is in a closed position, the first opening exposes the first speaker unit only and, when the cover is in an open position, the cover opening exposes both the first speaker units the camera lens housing.

11. A sliding/swing-type portable digital communication apparatus comprising:
   a first housing extending in a longitudinal direction and having camera lens openings formed on predetermined areas of each of its top and bottom surfaces;
   a rotatable camera lens housing positioned in the camera lens openings and having a camera lens adapted to be visibly exposed toward the top or bottom surfaces;
   a pair of stereo speaker units mounted on the bottom surface of the first housing and disposed adjacent to the rotatable camera lens housing;
   a cover coupled to a portion of the bottom surface of the first housing and adapted to slide along the longitudinal direction;
   a first opening formed on the cover to selectively expose the rotatable camera lens housing or the stereo speaker unit according to whether or not the cover has been slid; and
   a second opening formed by the cover adjacent to the first opening to expose/hide the stereo speaker unit only.

12. A sliding/swing-type portable digital communication apparatus as claimed in claim 11, wherein the first housing is provided with, on its top surface, a first key array composed of a number of keys and a second key array composed of a number of keys disposed adjacent to the first key array, the number of keys of the first key array being smaller than number of keys of the second key array.

13. A sliding/swing-type portable digital communication apparatus as claimed in claim 11, wherein the rotatable camera lens housing has a hinge axis oriented perpendicular to the longitudinal direction of the first housing and is provided with a lighting unit disposed adjacent to the camera lens along the hinge axis.

14. A sliding/swing-type portable digital communication apparatus as claimed in claim 11, wherein the first opening extends in a direction perpendicular to the longitudinal direction.

15. A sliding/swing-type portable digital communication apparatus as claimed in claim 11, wherein, when the cover is closed, the first opening exposes the first stereo speaker unit only and, when the cover is open, the first opening exposes the the rotatable camera lens housing and the second opening exposes the stereo speaker unit.

* * * * *